US012665246B2

(12) United States Patent
Miyamura et al.

(10) Patent No.: US 12,665,246 B2
(45) Date of Patent: Jun. 23, 2026

(54) NON-AQUEOUS ELECTROLYTE SECONDARY BATTERY

(71) Applicant: Panasonic Holdings Corporation, Osaka (JP)

(72) Inventors: Yukinobu Miyamura, Hyogo (JP); Hiroaki Imanishi, Hyogo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 770 days.

(21) Appl. No.: 17/787,126

(22) PCT Filed: Nov. 20, 2020

(86) PCT No.: PCT/JP2020/043375
§ 371 (c)(1),
(2) Date: Jun. 17, 2022

(87) PCT Pub. No.: WO2021/124797
PCT Pub. Date: Jun. 24, 2021

(65) Prior Publication Data
US 2023/0033391 A1 Feb. 2, 2023

(30) Foreign Application Priority Data
Dec. 19, 2019 (JP) ................................. 2019-229170

(51) Int. Cl.
*H01M 50/188* (2021.01)
*H01M 50/103* (2021.01)
(Continued)

(52) U.S. Cl.
CPC ....... *H01M 50/188* (2021.01); *H01M 50/103* (2021.01); *H01M 50/538* (2021.01); *H01M 50/547* (2021.01); *H01M 50/583* (2021.01)

(58) Field of Classification Search
CPC .. H01M 10/052; H01M 50/54; H01M 50/103; H01M 50/188; H01M 50/533;
(Continued)

(56) References Cited

U.S. PATENT DOCUMENTS

2011/0244281 A1* 10/2011 Byun .................. H01M 50/583
429/62
2011/0305928 A1 12/2011 Kim et al.
(Continued)

FOREIGN PATENT DOCUMENTS

CN 110168777 A 8/2019
CN 114223088 A * 3/2022 ............ H01M 50/54
(Continued)

OTHER PUBLICATIONS

Indian First Examination Report dated Oct. 17, 2022 issued in the corresponding Indian Patent Application No. 202247039912, with English translation.
(Continued)

*Primary Examiner* — Mark Ruthkosky
(74) *Attorney, Agent, or Firm* — Rimon P.C.

(57) ABSTRACT

A non-aqueous electrolyte secondary battery includes: an electrode assembly; a rectangular outer casing; a sealing plate; an electrode terminal on the sealing plate; a first current collector connected to the electrode terminal; a second current collector connected to the first current collector; and a tab group connected to the second current collector. The second current collector is a flat plate, and includes a fuse portion having a slit extending in a lateral direction of the flat plate. The tab group is connected to the second current collector at a position closer to one side in the lateral direction, and is bent at a connection portion with the second current collector such that the bent tab group extends parallel to the side wall. The fuse portion includes a portion (Continued)

with a large sectional area on the other side of the slit in the lateral direction.

9 Claims, 12 Drawing Sheets

(51) Int. Cl.
    *H01M 50/538*      (2021.01)
    *H01M 50/547*      (2021.01)
    *H01M 50/583*      (2021.01)

(58) Field of Classification Search
    CPC ............. H01M 50/538; H01M 50/547; H01M 50/553; H01M 50/581; H01M 50/583; H01M 50/55
    See application file for complete search history.

(56) References Cited

U.S. PATENT DOCUMENTS

| | | | |
|---|---|---|---|
| 2013/0136960 A1 | 5/2013 | Guen | |
| 2013/0288088 A1 | 10/2013 | Byun | |
| 2016/0049635 A1* | 2/2016 | Park ................... | H01M 50/534 |
| | | | 429/185 |
| 2016/0336576 A1* | 11/2016 | Shinoda ............. | H01M 50/533 |
| | | | 429/94 |
| 2019/0006717 A1* | 1/2019 | Wakimoto .......... | H01M 50/188 |
| | | | 429/209 |
| 2019/0067664 A1 | 2/2019 | Kwak | |
| 2019/0334167 A1 | 10/2019 | Kamo et al. | |
| 2019/0386285 A1 | 12/2019 | Takahashi et al. | |
| 2022/0384915 A1* | 12/2022 | Murata .............. | H01M 50/574 |

FOREIGN PATENT DOCUMENTS

| | | |
|---|---|---|
| EP | 3451415 A1 | 3/2019 |
| JP | 2011-258550 A | 12/2011 |
| JP | 2012-015102 A | 1/2012 |
| JP | 2013-115042 A | 6/2013 |
| JP | 2019-087341 A | 6/2019 |

OTHER PUBLICATIONS

Hearing Notice dated Mar. 1, 2024 issued in the corresponding Indian Patent Application No. 202247039912, with English translation.

Extended European Search Report dated Feb. 16, 2024 issued in the corresponding European Patent Application No. 20903787.8.

International Search Report issued in International Patent Application No. PCT/JP2020/043375, dated Feb. 2, 2021, with English translation.

* cited by examiner

NON-AQUEOUS ELECTROLYTE SECONDARY BATTERY

CROSS-REFERENCE OF RELATED APPLICATIONS

This application is the U.S. National Phase under 35 U.S.C. § 371 of International Patent Application No. PCT/JP2020/043375, filed on Nov. 20, 2020, which in turn claims the benefit of Japanese Patent Application No. 2019-229170, filed on Dec. 19, 2019, the entire disclosures of which Applications are incorporated by reference herein.

TECHNICAL FIELD

The present disclosure relates to non-aqueous electrolyte secondary batteries.

BACKGROUND ART

In a non-aqueous electrolyte secondary battery such as a lithium-ion battery, an electrode assembly is housed in a rectangular outer casing having an opening, and the opening is sealed by a sealing plate. Electrode terminals provided on the sealing plate and tab groups extending from the electrode assembly are electrically connected to each other by current collectors.

As described in Patent Document 1, a configuration in which a current collector of a non-aqueous electrolyte secondary battery has a fuse portion is known in the art. This fuse portion is a portion having a smaller sectional area than the remaining portion of the current collector. The fuse portion is blown when an overcurrent occurs and the temperature reaches the melting point due to current concentration. Overheating and ignition due to the overcurrent can thus be prevented.

CITATION LIST

Patent Document

PATENT DOCUMENT 1: Japanese Unexamined Patent Publication No. 2011-258550

SUMMARY OF THE INVENTION

Since the fuse portion has a small sectional area, the fuse portion is less strong than the other portions. Accordingly, when the distribution of stress that is applied to the fuse portion is uneven, a part of the fuse portion that is subjected to a large stress may be deformed.

A non-aqueous electrolyte secondary battery according to the present disclosure includes: an electrode assembly including a positive electrode plate and a negative electrode plate; a rectangular outer casing having an opening and housing the electrode assembly; a sealing plate sealing the opening; an electrode terminal located on the sealing plate; a first current collector located between the electrode assembly and the sealing plate and connected to the electrode terminal; a second current collector located between the electrode assembly and a side wall of the rectangular outer casing and connected to the first current collector; and a tab group extending from the electrode assembly toward the side wall and connected to the second current collector. The second current collector is a flat plate including a surface parallel to the side wall, and includes a fuse portion having a slit extending in a lateral direction of the flat plate. The tab group is connected to the second current collector at a position closer to one side in the lateral direction of the flat plate, and is bent at a connection portion with the second current collector such that the bent tab group extends parallel to the side wall. The fuse portion includes a portion with a large sectional area on the other side of the slit in the lateral direction of the flat plate.

According to the present disclosure, deformation of a fuse portion of a current collector can be reduced in a non-aqueous electrolyte secondary battery.

BRIEF DESCRIPTION OF THE DRAWINGS

FIG. 4 shows a portion near a connection portion between a second current collector and a tab group before the tab group is bent.

DESCRIPTION OF EMBODIMENTS

The applicant discloses the structure of a non-aqueous electrolyte secondary battery in the specification of an earlier application (Japanese Patent Application No. 2019-174878).

Figure 1:
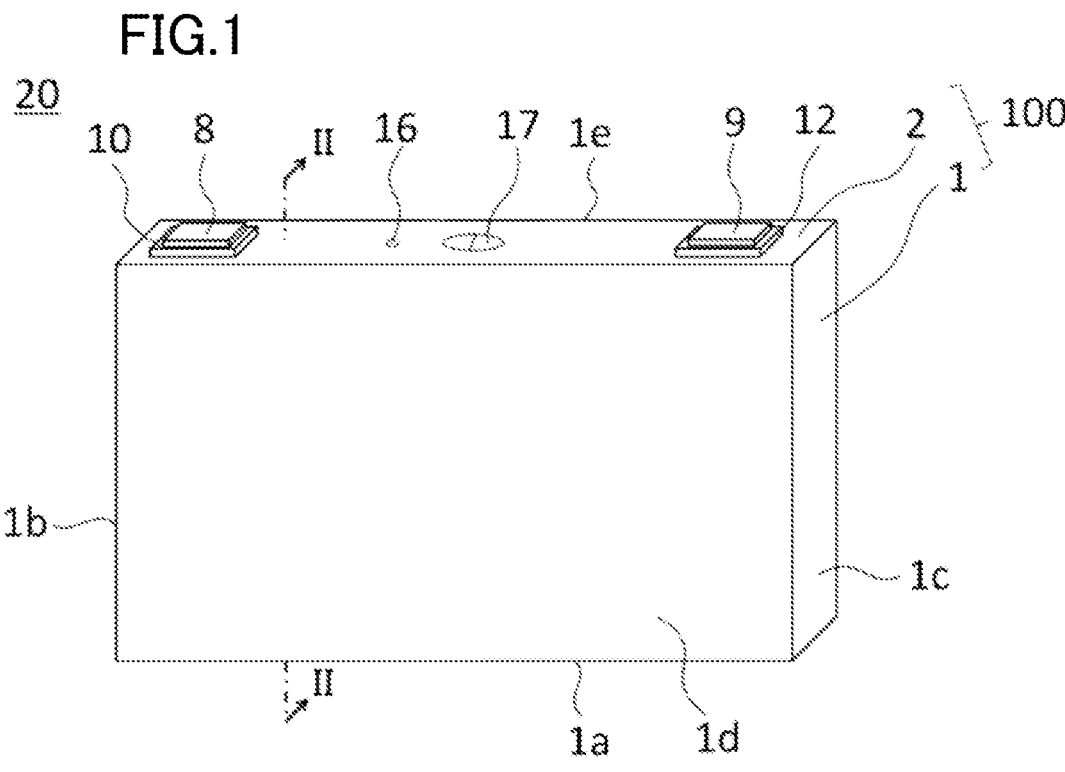
FIG. 1 is a perspective view of a non-aqueous electrolyte secondary battery according to an embodiment of the present disclosure.
Figure 2:
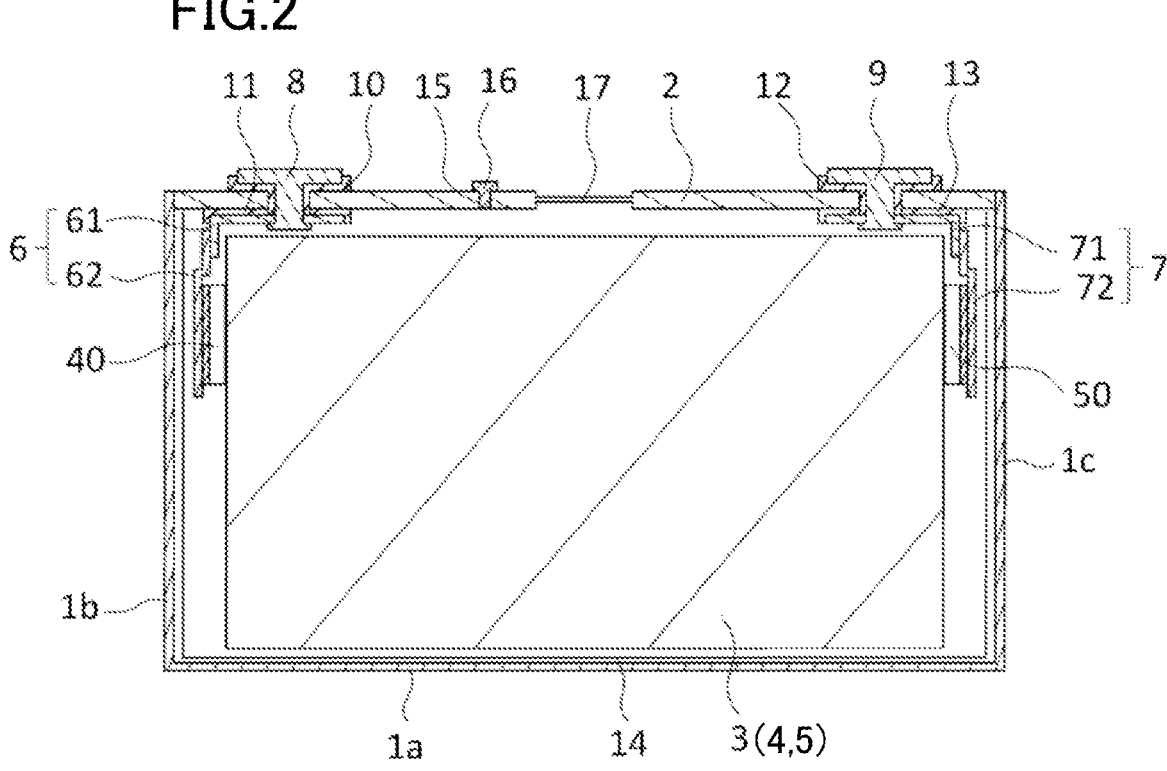
FIG. 2 is a sectional view taken along line II-II in FIG. 1.

As shown in FIGS. 1 and 2, in a non-aqueous electrolyte secondary battery 20 disclosed in the above specification, a tab group 40 of an electrode assembly 3 housed in a rectangular outer casing 1 and an electrode terminal 8 provided on a sealing plate 2 are electrically connected to each other by a first current collector 61 and a second current collector 62.

The first current collector 61 is disposed between the electrode assembly 3 and the sealing plate 2 and is connected to the electrode terminal 8. The second current collector 62 is a flat plate disposed between the electrode assembly 3 and a side wall 1b of the rectangular outer casing 1 and having a surface parallel to the side wall 1b, and is connected to the first current collector 61.

Figure 3:
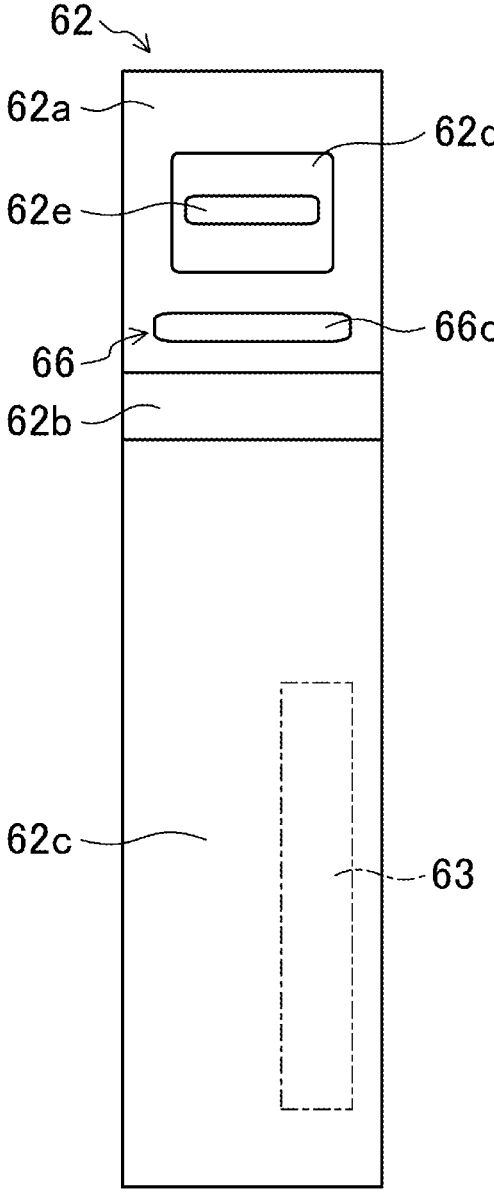
FIG. 3 shows a second current collector according to an earlier application.

The tab group 40 extends from the electrode assembly 3 toward the side wall 1b, and is connected to the second current collector 62. As shown in FIG. 3, the second current collector 62 includes a fuse portion 66 having a fuse hole (slit) 66c extending in the lateral direction of the flat plate. The fuse portion 66 is a portion having a smaller sectional area than the remaining portion of the second current collector 62.

Figure 4:
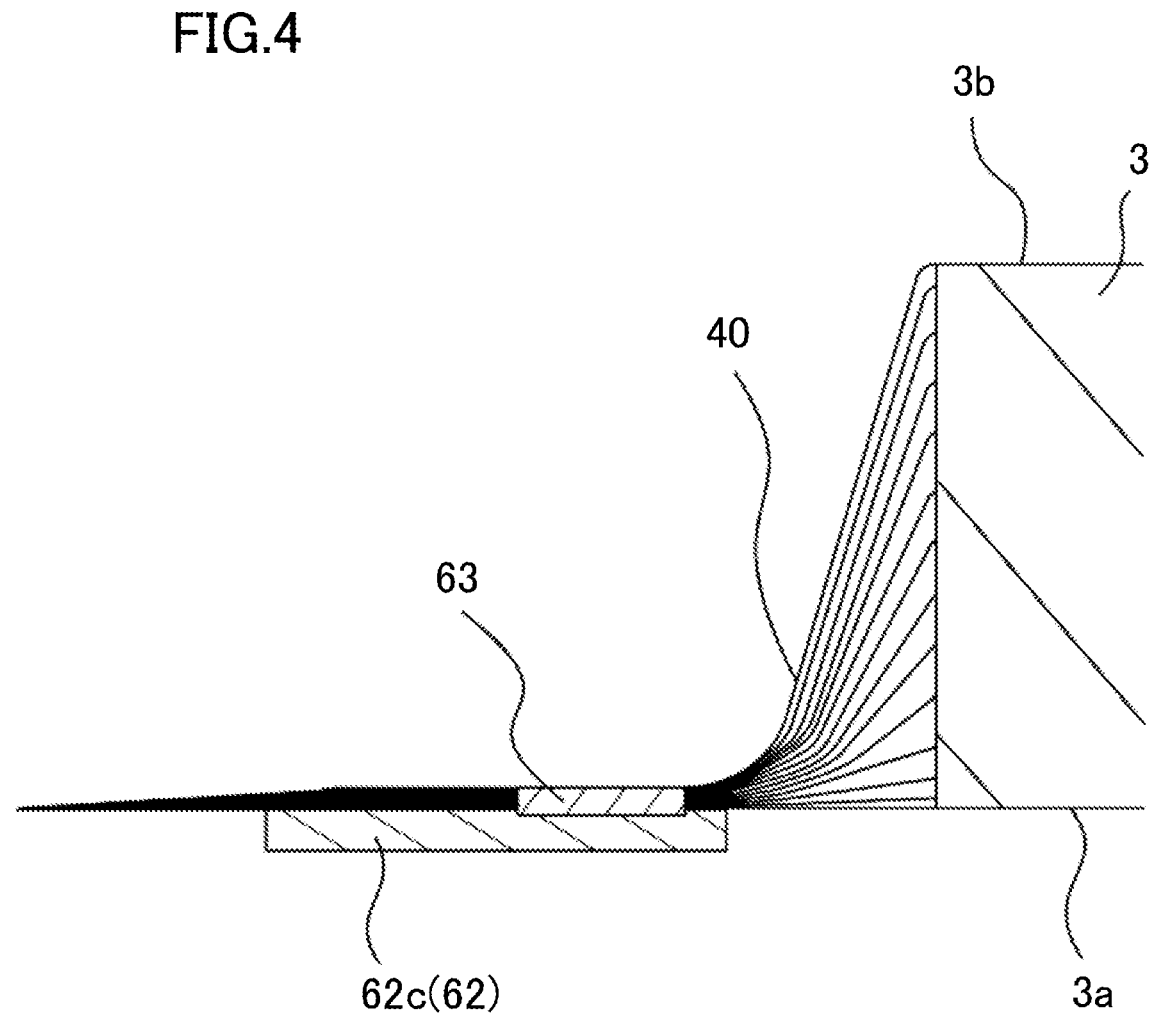
Figure 5:
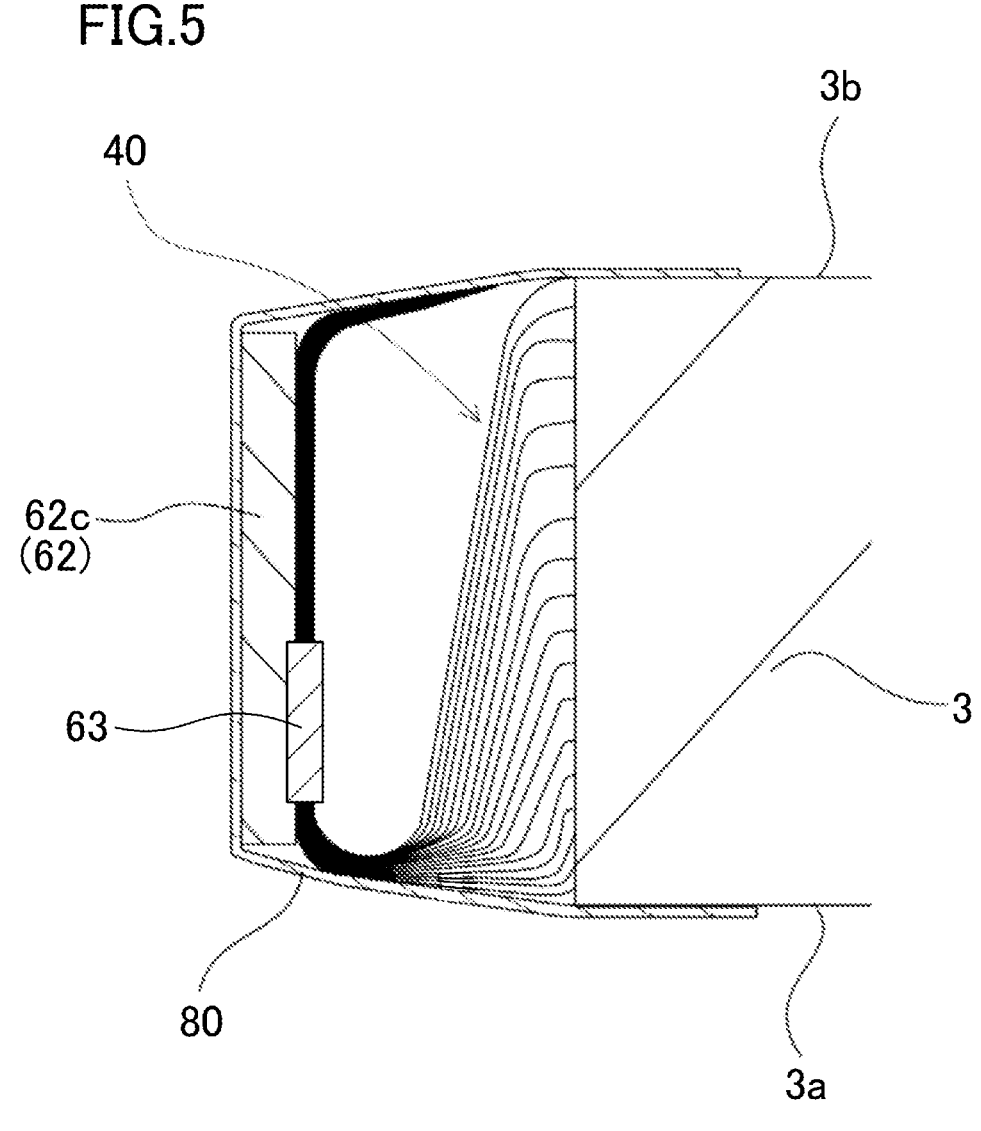
FIG. 5 shows the portion near the connection portion between the second current collector and the tab group after the tab group is bent.

As shown in FIG. 4, the tab group 40 is connected to the second current collector 62 at a position closer to one side in the lateral direction of the flat plate. As shown in FIG. 5, the tab group 40 is bent at a connection portion 63 with the second current collector 62 such that the bent tab group 40 extends parallel to the side wall 1b (see FIG. 2).

According to this configuration, the tab group 40 can be bent without bending the second current collector 62. A non-aqueous electrolyte secondary battery having a high volumetric energy density can thus be manufactured by a simple method.

Figure 14:
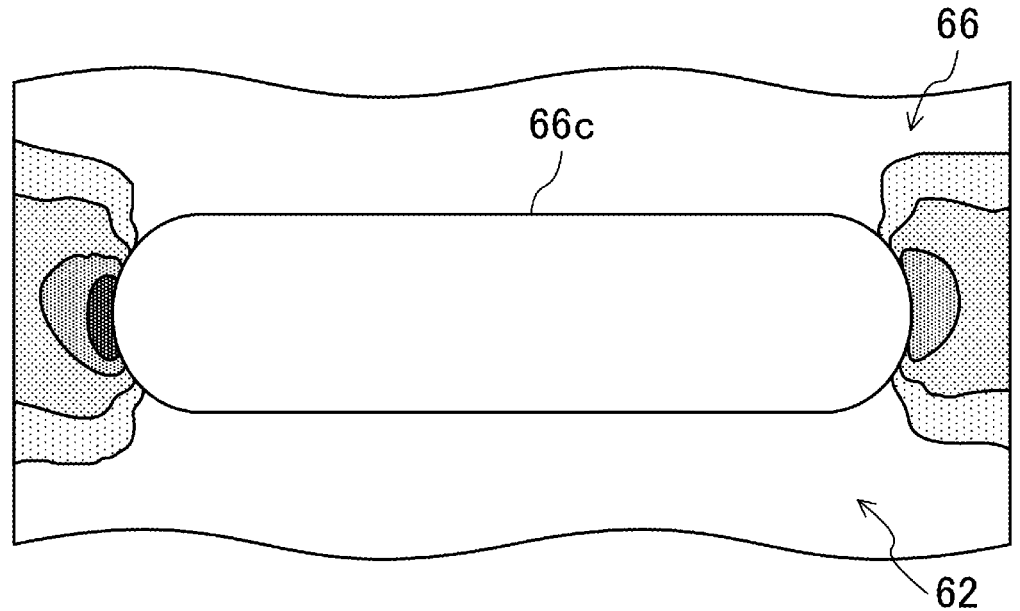
FIG. 14 is a contour diagram showing the distribution of stress that is applied to a fuse portion.

However, the above configuration has the following problem. FIG. 14 shows the simulation result of the distribution of stress that is applied to the fuse portion 66 by the reaction force applied from the bent tab group 40 to the second current collector 62 when the tab group 40 is bent. The darker the shaded area, the larger the stress. Since the connection portion 63 of the second current collector 62 with the tab group 40 is located closer to the one side in the lateral direction of the flat plate (see FIGS. 4 and 5), the distribution of the stress that is applied to the fuse portion 66 is uneven.

As shown in FIG. 14, a large stress is applied particularly to a part of the fuse portion 66 that is located on the other side (left side in FIG. 14) of the slit 66c in the lateral direction of the flat plate. The fuse portion 66 originally has a small sectional area and low strength. Therefore, the fuse portion 66 may be deformed due to this large stress.

The inventors thought that this problem would be solved by configuring the fuse portion 66 that has a portion with a large sectional area on the other side of the slit 66c in the lateral direction of the flat plate, and arrived at the invention.

An embodiment of the present disclosure will be described in detail with reference to the drawings. The following description of a preferred embodiment is merely illustrative in nature and is not at all intended to limit the disclosure, its applications, or its uses. Since the basic configuration of a non-aqueous electrolyte secondary battery in the present embodiment is the same as in the earlier application, FIGS. 1, 2, 4, and 5 used in the description of the earlier application are also used for the description of the embodiment.

FIG. 1 is a perspective view of a non-aqueous electrolyte secondary battery according to the present disclosure. FIG. 2 is a sectional view taken along line II-II in FIG. 1. As shown in FIGS. 1 and 2, a non-aqueous electrolyte secondary battery 20 includes a battery case 100 composed of a rectangular outer casing 1 in the shape of a bottomed rectangular tube having an opening and a sealing plate 2 that seals the opening of the rectangular outer casing 1.

The rectangular outer casing 1 includes a bottom 1a, a pair of first side walls 1b, 1c, and a pair of second side walls 1d, 1e. The pair of first side walls 1b, 1c is located so as to face each other. The pair of second side walls 1d, 1e is located so as to face each other. The pair of first side walls 1b, 1c is perpendicular to the longitudinal direction of the sealing plate 2, and the area of the pair of first side walls 1b, 1c is smaller than the area of the pair of second side walls 1d, 1e.

An electrode assembly 3 including a positive electrode plate 4 and a negative electrode plate 5 is housed together with an electrolyte in the rectangular outer casing 1. In the present embodiment, the electrode assembly 3 is a flat wound electrode assembly formed by winding the positive electrode plate 4 and the negative electrode plate 5 with a separator interposed therebetween. The winding axis of the electrode assembly 3 extends perpendicular to the first side walls 1b, 1c and parallel to the second side walls 1d, 1e. The electrode assembly 3 is not limited to the wound electrode assembly, and may be, for example, a stacked electrode assembly formed by stacking the positive electrode plate 4 and the negative electrode plate 5 with a separator interposed therebetween.

In FIG. 2, reference character 10 indicates an outer insulation member located between the sealing member 2 and a positive electrode terminal 8. Reference character 11 indicates an inner insulation member located between the sealing member 2 and a first positive electrode current collector 61. Reference character 14 indicates a box- or bag-shaped insulation sheet disposed in the rectangular outer casing 1 and housing the electrode assembly 3. Reference character 15 indicates an electrolyte solution inlet in the sealing plate 2. Reference character 16 indicates a sealing member that seals the electrolyte solution inlet 15. Reference character 17 indicates a gas discharge valve in the sealing plate 2.

As used herein, the positive electrode side refers to one side of the non-aqueous electrolyte secondary battery 20 in the direction in which the winding axis of the electrode assembly 3 extends, and the negative electrode side refers to the other side of the non-aqueous electrolyte secondary battery 20. Hereinafter, the positive electrode side will be mainly described, and description of the negative electrode side may be omitted.

The electrode assembly 3 has a positive electrode tab group 40 at its one end in the direction in which the winding axis extends. Specifically, the positive electrode tab group 40 extends from the one end of the electrode assembly 3 toward the side wall 1b. The positive electrode tab group 40 is a stack of a plurality of positive electrode tabs.

The positive electrode terminal 8 as an electrode terminal is located on the sealing plate 2. The positive electrode terminal 8 is electrically connected to the positive electrode tab group 40 via a positive electrode current collector 6. The positive electrode current collector 6 is composed of the first positive electrode current collector 61 and a second positive electrode current collector 62.

The first positive electrode current collector 61 has a substantially L-shape in section, and is disposed between the electrode assembly 3 and the sealing plate 2. Specifically, the first positive electrode current collector 61 has a first region disposed along the sealing plate 2 and a second region bent at the end of the first region. The second region extends toward the bottom 1a along the first side wall 1b. The first positive electrode current collector 61 is connected to the positive electrode terminal 8.

The second positive electrode current collector 62 is disposed between the electrode assembly 3 and the first side wall 1b of the rectangular outer casing 1. Specifically, the second positive electrode current collector 62 is a flat plate having a surface parallel to the first side wall 1b, and extends toward the bottom 1a along the first side wall 1b. The second positive electrode current collector 62 is connected to the first positive electrode current collector 61.

Figure 6:
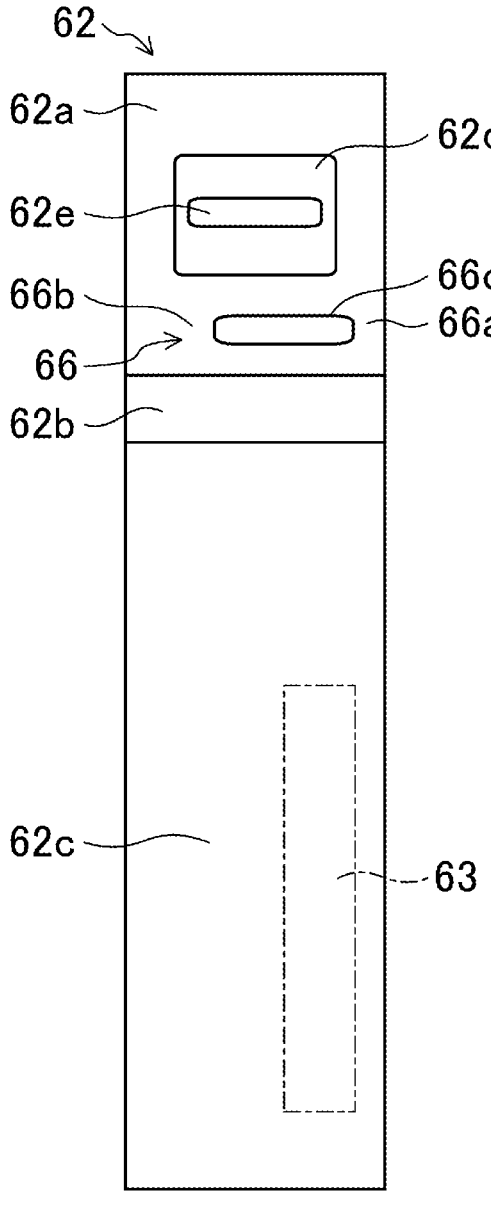
FIG. 6 shows a second current collector according to an embodiment.

FIG. 6 shows the second positive electrode current collector 62. The second positive electrode current collector 62 includes a current collector connection portion 62a, a tilted portion 62b, and a tab connection portion 62c. The current collector connection portion 62a is connected to the first positive electrode current collector 61. The positive electrode tab group 40 is connected to the tab connection portion 62c. The tilted portion 62b connects the current collector connection portion 62a and the tab connection portion 62c, and is tilted with respect to both of the current collector connection portion 62a and the tab connection portion 62c.

The current collector connection portion 62a has a recess 62d. The recess 62d has a through hole 62e. In the recess 62d, the current collector connection portion 62a is joined to the first positive electrode current collector 61.

The second positive electrode current collector 62 has a fuse portion 66. The fuse portion 66 will be described in detail later.

Figure 7:
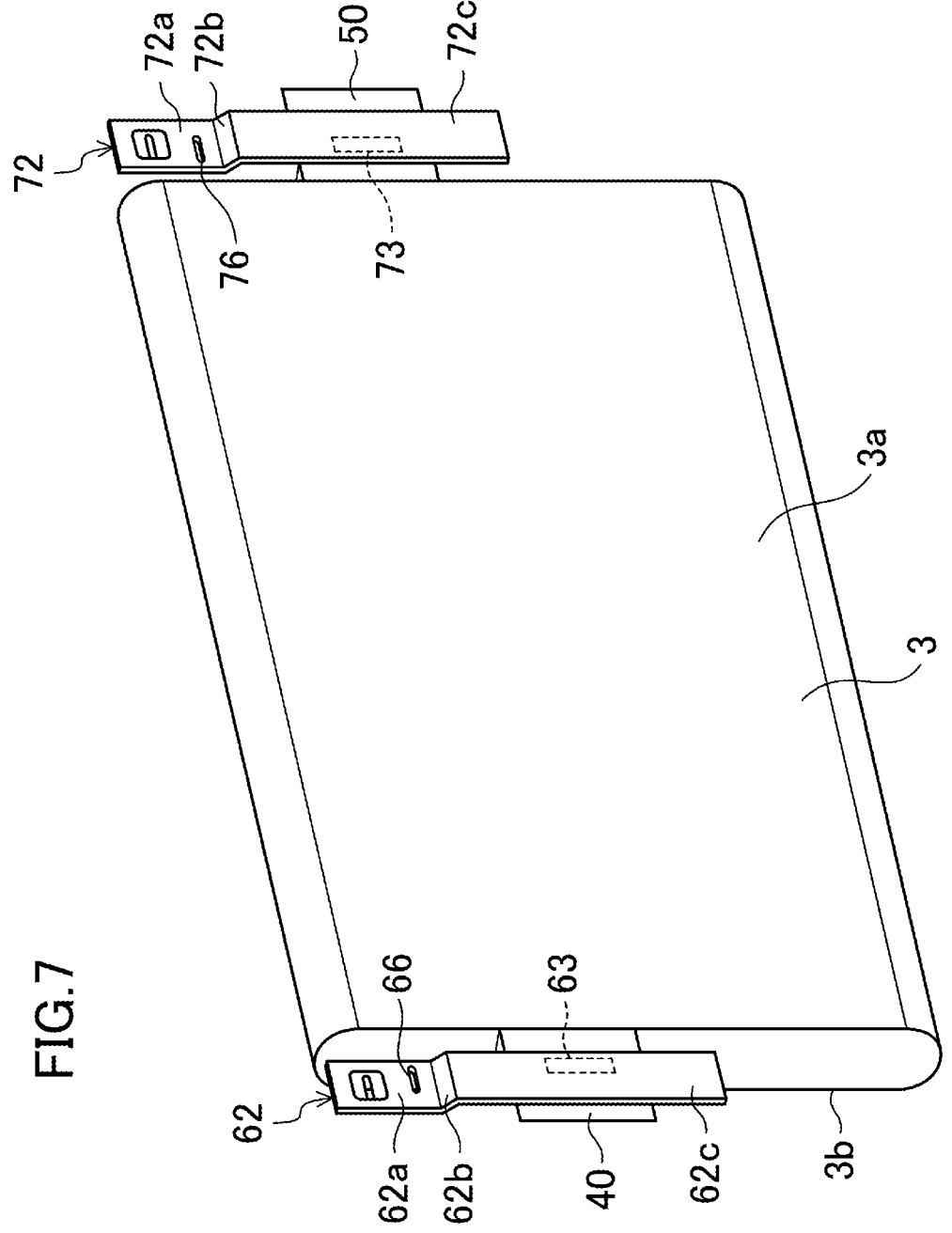
FIG. 7 is a perspective view of an electrode assembly with tab groups connected to second current collectors before the tab groups are bent.

Next, bending of the positive electrode tab group 40 and connection between the positive electrode tab group 40 and the second positive electrode current collector 62 will be described. FIG. 4 shows a portion near the connection portion between the second positive electrode current collector 62 and the positive electrode tab group 40 before the positive electrode tab group 40 is bent. FIG. 7 shows the electrode assembly 3 with the positive electrode tab group 40 connected to the second positive electrode current collector 62 before the positive electrode tab group 40 is bent.

The positive electrode tab group 40 is connected to the tab connection portion 62c of the second positive electrode current collector 62. Specifically, as shown in FIG. 4, before the positive electrode tab group 40 is bent, the positive electrode tab group 40 is placed on the tab connection portion 62c of the second positive electrode current collector 62. In this state, the tab connection portion 62c and the positive electrode tab group 40 are joined (welded) together to form a connection portion 63.

As shown in FIG. 4, the positive electrode tab group 40 is connected to the tab connection portion 62c of the second positive electrode current collector 62 at a position closer to one side in the lateral direction (right side in FIG. 4) of the flat plate. That is, the connection portion 63 between the positive electrode tab group 40 and the tab connection portion 62c is located closer to the root of the positive electrode tab group 40 in the lateral direction of the flat plate (i.e., closer the one side in the lateral direction, the right side in FIG. 4). With this configuration, a curved shape can be more reliably stably formed near the root of the positive electrode tab group 40 when the positive electrode tab group 40 is bent.

FIG. 5 shows a portion near the connection portion between the second positive electrode current collector 62 and the positive electrode tab group 40 after the positive electrode tab group 40 is bent. By bending the positive electrode tab group 40, the tab connection portion 62c of the second positive electrode current collector 62 disposed substantially parallel to a first main surface 3a and a second main surface 3b of the electrode assembly 3 (see FIGS. 4 and 7) is oriented to extend substantially perpendicular to the winding axis of the electrode assembly 3. That is, the positive electrode tab group 40 is bent at the connection portion 63 with the second positive electrode current collector 62 such that the bent positive electrode tab group 40 extends parallel to the first side wall 1b. The bent positive electrode tab group 40 is fixed to the electrode assembly 3 with a tape 80.

Next, the configuration of the fuse portion 66 will be described in detail with reference to FIG. 6. As described above, the current collector connection portion 62a of the second positive electrode current collector 62 has the fuse portion 66. The fuse potion 66 has a slit 66c extending in the lateral direction of the flat plate.

The fuse portion 66 is composed of a portion 66a located on one side (right side in FIG. 6) of the slit 66c in the lateral direction of the flat plate, and a portion 66b located on the other side (left side in FIG. 6) of the slit 66c in the lateral direction of the flat plate. Since the portions 66a, 66b have a smaller sectional area than the remaining portion of the flat plate, the portion 66a and/or the portion 66b is blown when an overcurrent flows through the second positive electrode current collector 62. As used herein, the sectional area means the area in section parallel to the lateral direction of the flat plate.

Specifically, the slit 66c is offset toward the one side in the lateral direction of the flat plate. The portion 66b is therefore wider than the portion 66a. That is, the fuse portion 66 has the wide portion 66b on the other side of the slit 66c in the lateral direction of the flat plate.

As described above, the connection portion 63 of the second positive electrode current collector 62 with the positive electrode tab group 40 is located closer to the one side in the lateral direction of the flat plate. Accordingly, a large stress is applied to a part of the fuse portion 66 that is located on the other side of the slit 66c in the lateral direction of the flat plate (see FIG. 14). In the case where the slit 66c is located in the middle in the lateral direction of the flat plate as shown in FIG. 3, the fuse portion 66 may be deformed due to this large stress.

In the present embodiment, the fuse portion 66 has the portion 66b with a large sectional area on the other side of the slit 66c in the lateral direction of the flat plate, so that the portion 66b that is subjected to a large stress has increased strength.

This configuration reduces deformation of the fuse portion 66 of the second positive electrode current collector 62 in the non-aqueous electrolyte secondary battery 20.

In the present embodiment, since the sectional area of the portion 66b of the fuse portion 66 that is located on the other side of the slit 66c in the lateral direction of the flat plate is increased, the sectional area of the portion 66a of the fuse portion 66 that is located on the one side of the slit 66c in the lateral direction of the flat plate is reduced accordingly. That is, the overall sectional area of the fuse portion 66 is kept as small as possible by reducing the sectional area of the portion 66a on the one side of the lateral direction that is subjected to a relatively small stress. This ensures that the fuse portion 66 performs its intended function.

In the fuse portion 66, the portion 66b located on the other side of the slit 66c in the lateral direction of the flat plate has a greater width. Since the portion with a larger sectional area is thus located on the other side in the lateral direction of the flat plate, the structure is simple.

In the fuse portion 66, the slit 66c is offset toward the one end in the lateral direction of the flat plate. This makes it easy for the fuse portion 66 to have the wide portion 66b on the other side in the lateral direction of the flat plate and have the narrower portion 66a on the one side in the lateral direction of the flat plate.

In the present embodiment, the second positive electrode current collector 62 includes the fuse portion 66 having the wide portion 66b on the other side of the slit 66c in the lateral direction of the flat plate. However, the specific configuration of the fuse portion 66 is not particularly limited, and can be determined as appropriate according to the machining of the slit 66c, assembly of the second positive electrode current collector 62, etc.

Figure 10:
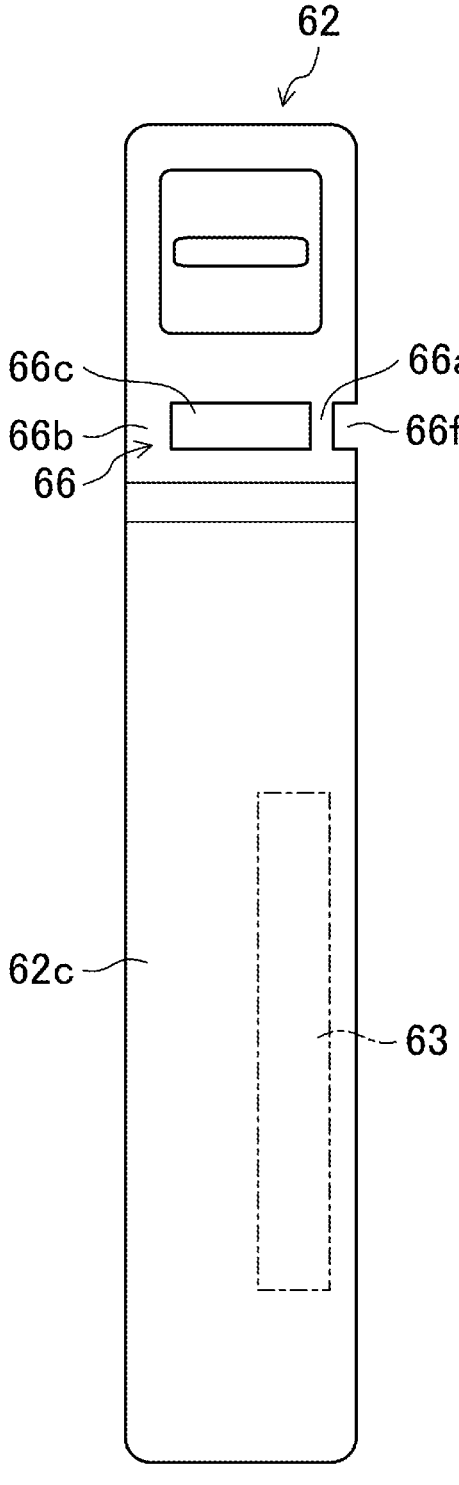
FIG. 10 is a diagram corresponding to FIG. 6, showing a first modification of the embodiment.

For example, FIG. 10 shows the second positive electrode current collector 62 according to a first modification of the embodiment. In this modification, the fuse portion 66 has a cut 66f on the one side of the slit 66c in the lateral direction of the flat plate (in the portion 66a).

In the case where the slit 66c is formed by pressing, the portions 66a, 66b on both sides of the slit 66c need to have a certain width dimension. Therefore, it may not be possible to make the width dimension of the portion 66a as small as desired. According to this configuration, the sectional area of the portion 66a can be reduced by forming the cut 66f in the portion 66a by cutting after the pressing.

Figure 11:
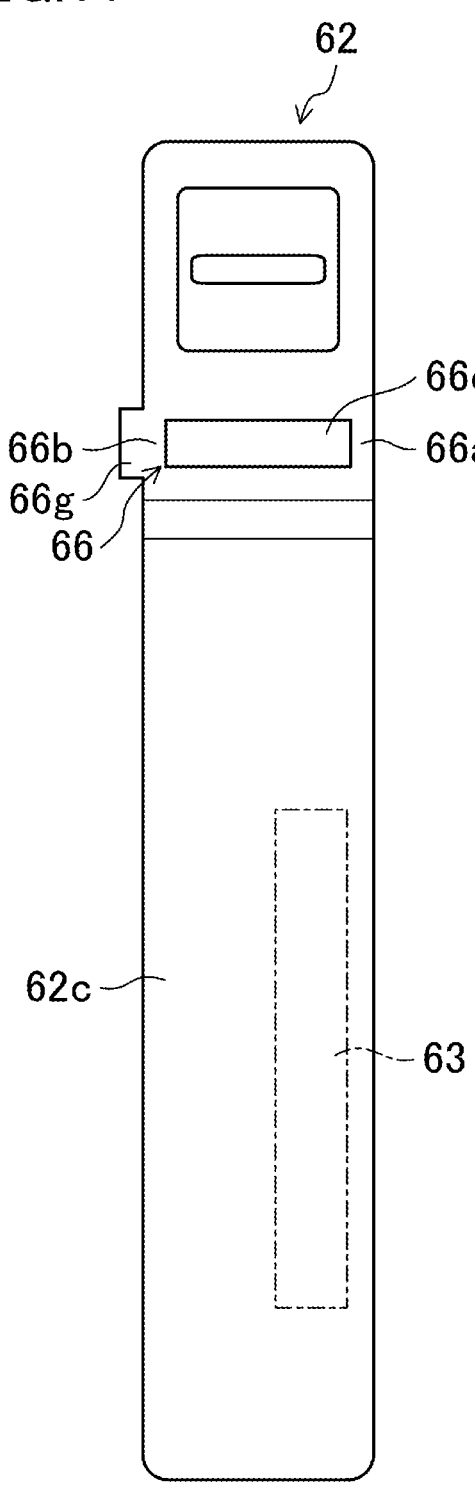
FIG. 11 is a diagram corresponding to FIG. 6, showing a second modification of the embodiment.

FIG. 11 shows the second positive electrode current collector 62 according to a second modification of the embodiment. In this modification, the fuse portion 66 has an extended portion 66g, which is extended in the lateral direction, on the other side of the slit 66c in the lateral direction of the flat plate (in the portion 66b).

In the case where it is not possible to make the width dimension of the portion 66a as small as desired as in the first modification, one way to reduce the sectional area of the portion 66a is to reduce the thickness of the flat plate. According to this configuration, by reducing the thickness of the flat plate, the sectional area of the portion 66b is reduced. However, this reduction in sectional area of the portion 66b can be compensated for by providing the extended portion 66g.

Figure 12:
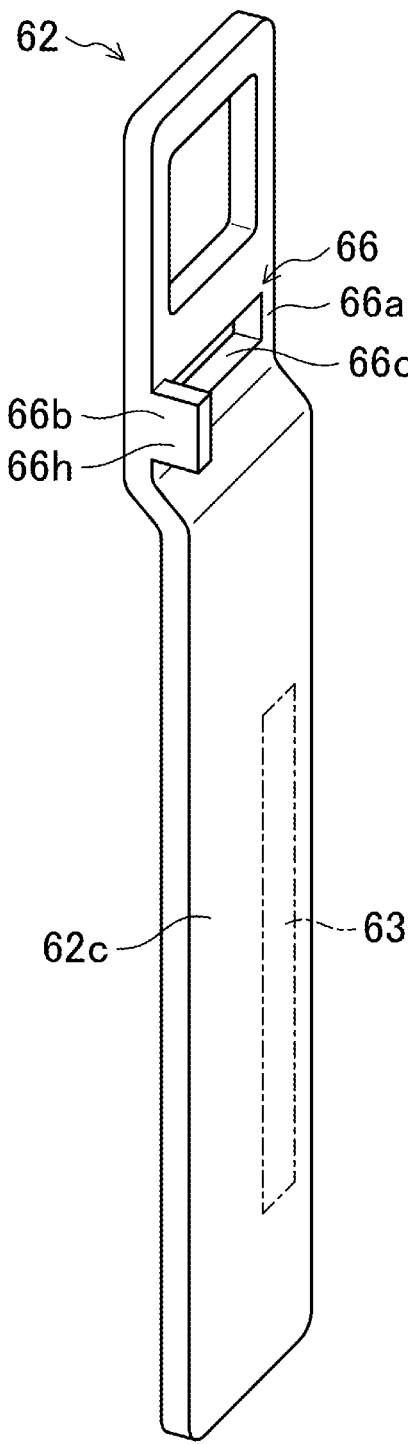
FIG. 12 is a diagram corresponding to FIG. 6, showing a third modification of the embodiment.

FIG. 12 shows the second positive electrode current collector 62 according to a third modification of the embodiment. In this modification, the fuse portion 66 has a protrusion 66h, which protrudes in the thickness direction, on the other side of the slit 66c in the lateral direction of the flat plate (in the portion 66b).

According to this configuration, since the protrusion 66h protrudes in the thickness direction, interference with an adjacent terminal in the lateral direction can be reduced.

The fuse portion 66 may have a thick portion on the other side of the slit 66c in the lateral direction of the flat plate (in the portion 66b).

The negative electrode side has a configuration similar to that of the positive electrode side. In FIG. 2, reference character 9 indicates a negative electrode terminal, reference character 50 indicates a negative electrode tab group, reference character 7 indicates a negative electrode current collector, reference character 71 indicates a first negative electrode current collector, reference character 72 indicates a second negative electrode current collector, reference character 12 indicates an outer insulation member, and reference character 13 indicates an inner insulation member. In FIG. 7, reference character 72a indicates a current collector connection portion, reference character 72b indicates a tilted portion, and reference character 72c indicates a tab connection portion.

Although the present invention is described above based on a preferred embodiment, the above description is not restrictive, and various modifications can be made.

The fuse portion 66 may not have the portion 66a located on the one side of the slit 66c in the lateral direction of the flat plate. That is, the slit 66c may be a cut extending from an end of the fuse portion 66 that is located on the one side in the lateral direction of the flat plate to a position near an end of the fuse portion 66 that is located on the other side in the lateral direction of the flat plate.

Figure 13:
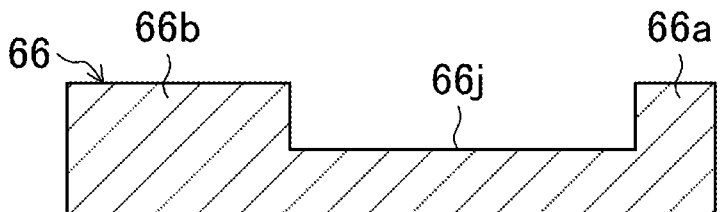
FIG. 13 shows a second current collector according to another embodiment.

As shown in FIG. 13, instead of the slit 66c, the fuse portion 66 may have a thin portion 66j that is thinner than the remaining portion of the flat plate and that extends in the lateral direction of the flat plate.

Figure 8:
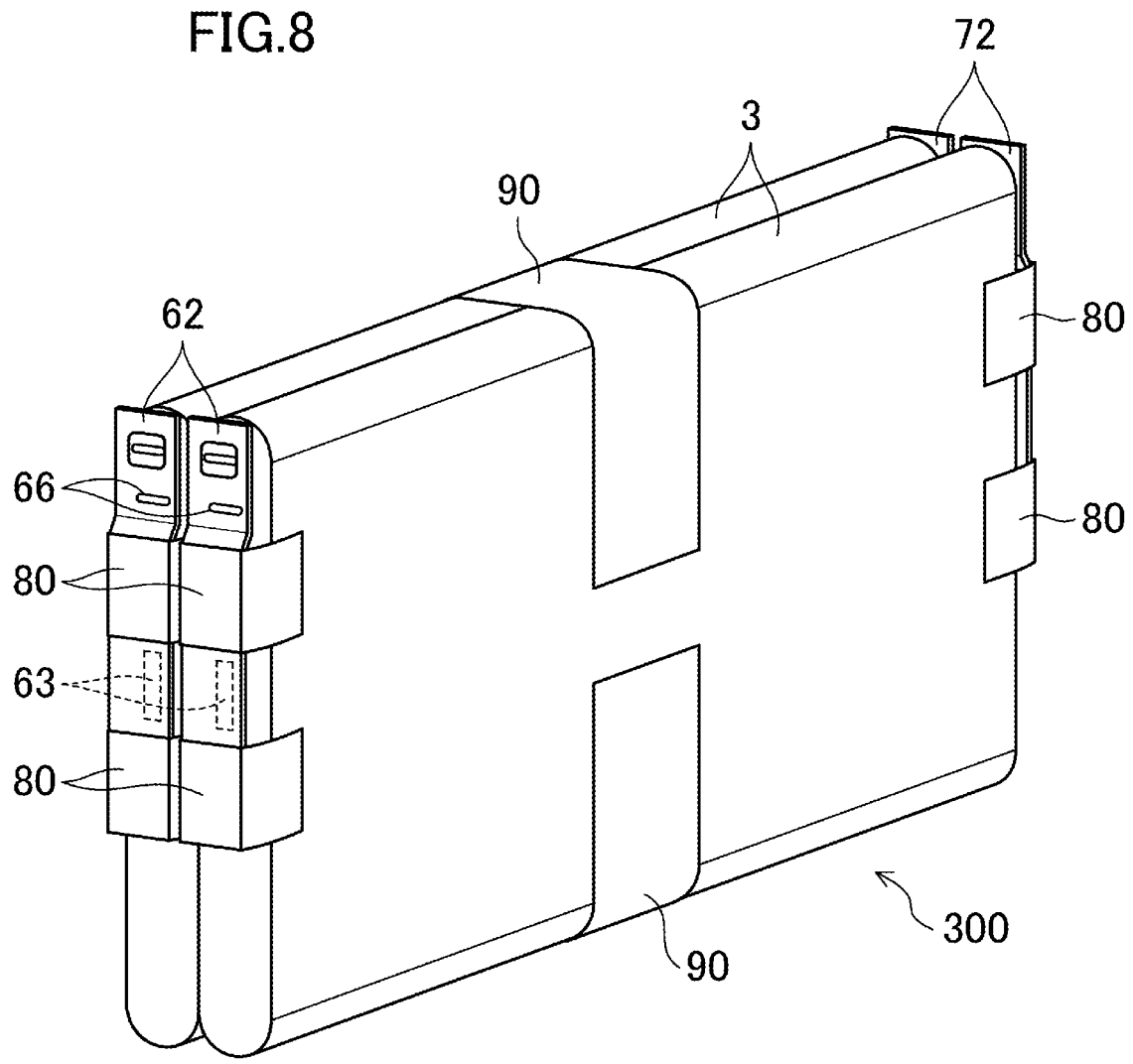
FIG. 8 shows an electrode assembly group including a plurality of electrode assemblies.

The non-aqueous electrolyte secondary battery 20 may include a plurality of electrode assemblies 3. FIG. 8 shows an electrode assembly group 300 including a plurality of electrode assemblies 3. As shown in FIG. 8, the non-aqueous electrolyte secondary battery 20 includes a plurality of (two) electrode assemblies 3. One second positive electrode current collector 62 is connected to the positive electrode tab group 40 of each electrode assembly 3. The plurality of electrode assemblies 3, 3 is arranged, and bundled and fixed together with a tape to form the electrode assembly group 300.

Figure 9:
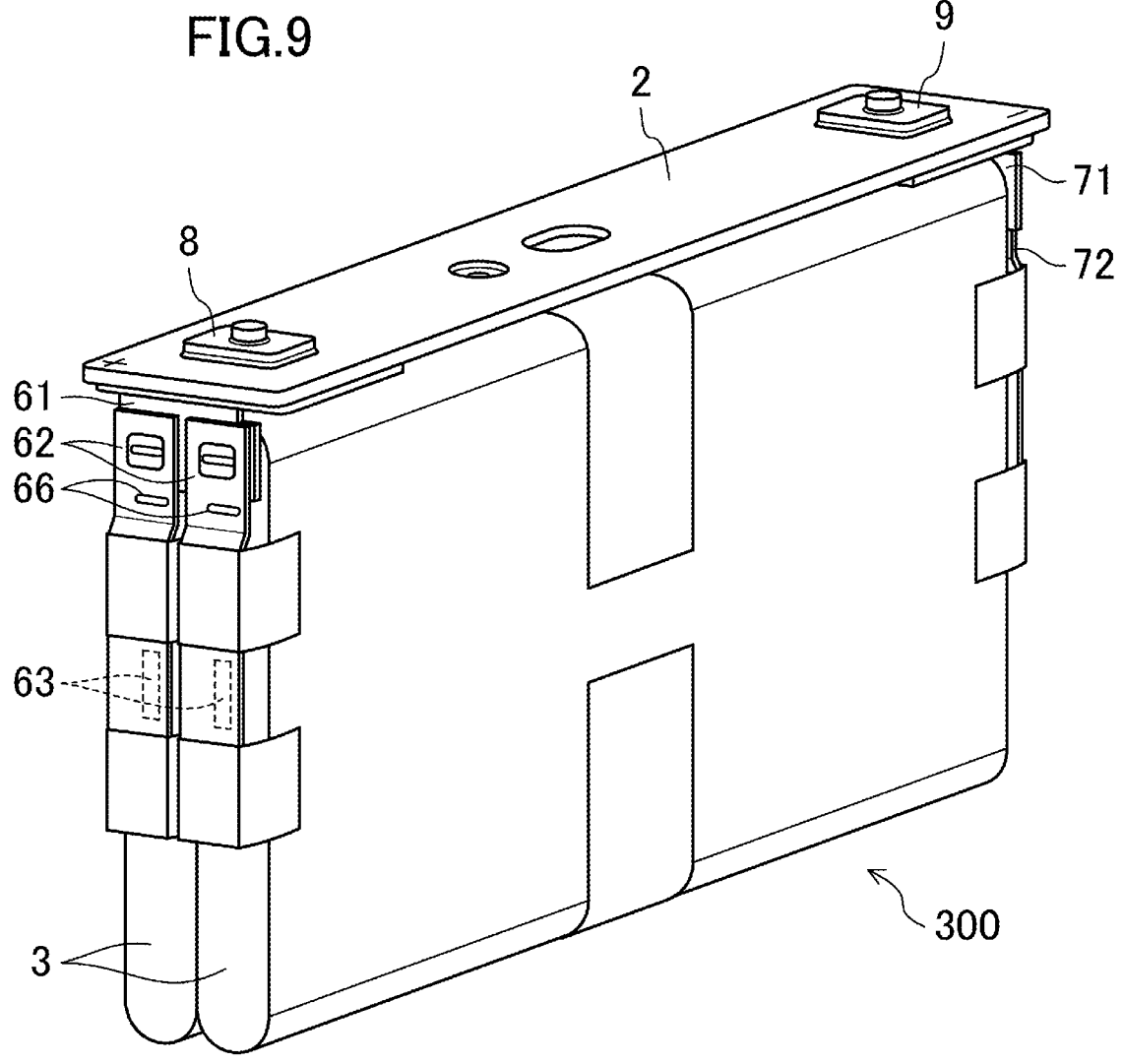
FIG. 9 shows the electrode assembly group and a sealing plate connected together by a first current collector and second current collectors.

FIG. 9 shows the electrode assembly group 300 and the sealing plate 2 connected together by the first positive electrode current collector 61 and the second positive electrode current collectors 62. As shown in FIG. 9, the second positive electrode current collectors 62 provided for each electrode assembly 3 are connected to the first positive electrode current collector 61 disposed on the sealing plate 2.

DESCRIPTION OF REFERENCE CHARACTERS

1 Rectangular Outer Casing
1b First Side Wall (Side Wall)
2 Sealing Plate
3 Electrode Assembly
4 Positive Electrode Plate
5 Negative Electrode Plate
8 Positive Electrode Terminal (Electrode Terminal)
20 Non-Aqueous Electrolyte Secondary Battery
40 Positive Electrode Tab Group (Tab Group)
61 First Positive Electrode Current Collector (First Current Collector)
62 Second Positive Electrode Current Collector (Second Current Collector)
63 Connection Portion
66 Fuse Portion
66a Portion
66b Portion
66c Slit
66f Cut
66g Extended Portion
66h Protrusion
66j Thin Portion

The invention claimed is:

1. A non-aqueous electrolyte secondary battery, comprising a plurality of electrode assemblies,
    wherein each of the plurality of electrode assemblies comprises:
        a positive electrode plate and a negative electrode plate;
        a rectangular outer casing having an opening and housing the electrode assembly;
        a sealing plate sealing the opening;
        an electrode terminal located on the sealing plate;
        a first current collector located between the electrode assembly and the sealing plate and connected to the electrode terminal;
        a second current collector located between the electrode assembly and a side wall of the rectangular outer casing and connected to the first current collector; and
        a tab group extending from the electrode assembly toward the side wall and connected to the second current collector, wherein the second current collector is a flat plate including a surface parallel to the side wall, and includes a fuse portion having a slit extending in a lateral direction of the flat plate, the tab group is connected to the second current collector at a position closer to one side of the slit than the other side of the slit opposite to the one side in the lateral direction of the flat plate, and is bent at a connection portion with the second current collector such that the bent tab group extends parallel to the side wall, the fuse portion includes a portion on the other side of the slit in the lateral direction of the flat plate, and a sectional area of the portion on the other side of the slit in the lateral direction of the flat plate is larger than a sectional area of a portion on the one side of the slit in the lateral direction of the flat plate, each of the plurality of second current collectors is connected to the corresponding tab group of the plurality of electrode assemblies, and each of the plurality of second current collectors is connected to the first current collector such that each of the plurality of electrode assemblies has an electrically isolated current path, whereby, even if an abnormality occurs in one electrode assembly and the fuse portion of the corresponding second current collector is blown, the current paths of the other electrode assemblies remain electrically and structurally intact.

2. The non-aqueous electrolyte secondary battery of claim 1, wherein the portion on the other side of the slit in the lateral direction of the flat plate is wider than the portion on the one side of the slit in the lateral direction of the flat plate.

3. The non-aqueous electrolyte secondary battery of claim 2, wherein the slit is offset toward the one side in the lateral direction of the flat plate.

4. The non-aqueous electrolyte secondary battery of claim 2, wherein the fuse portion has a cut on the one side of the slit in the lateral direction of the flat plate.

5. The non-aqueous electrolyte secondary battery of claim 2, wherein the fuse portion includes an extended portion on the other side of the slit in the lateral direction of the flat plate, the extended portion being extended in the lateral direction.

6. The non-aqueous electrolyte secondary battery of claim 1, wherein the fuse portion includes a protrusion on the other side of the slit in the lateral direction of the flat plate, the protrusion protruding in a thickness direction.

7. The non-aqueous electrolyte secondary battery of claim 1, wherein the portion on the other side of the slit in the lateral direction of the flat plate is thicker than the portion on the one side of the slit in the lateral direction of the flat plate.

8. A non-aqueous electrolyte secondary battery, comprising a plurality of electrode assemblies, wherein each of the plurality of electrode assemblies comprises:

an electrode assembly including a positive electrode plate and a negative electrode plate;

a rectangular outer casing having an opening and housing the electrode assembly;

a sealing plate sealing the opening;

an electrode terminal located on the sealing plate;

a first current collector located between the electrode assembly and the sealing plate and connected to the electrode terminal;

a second current collector located between the electrode assembly and a side wall of the rectangular outer casing and connected to the first current collector; and a tab group extending from the electrode assembly toward the side wall and connected to the second current collector, wherein the second current collector is a flat plate including a surface parallel to the side wall, and includes a fuse portion having a thin portion that is thinner than the remaining portion in a lateral direction of the flat plate, the tab group is connected to the second current collector at a position closer to one side of the thin portion than the other side of the thin portion opposite to the one side in the lateral direction of the flat plate, and is bent at a connection portion with the second current collector such that the bent tab group extends parallel to the side wall, the fuse portion includes a portion on the other side of the thin portion in the lateral direction of the flat plate, and a sectional area of the portion on the other side of the thin portion in the lateral direction of the flat plate is larger than a sectional area of a portion on the one side of the thin portion in the lateral direction of the flat plate, each of the plurality of second current collectors is connected to the corresponding tab group of the plurality of electrode assemblies, and each of the plurality of second current collectors is connected to the first current collector such that each of the plurality of electrode assemblies has an electrically isolated current path, whereby, even if an abnormality occurs in one electrode assembly and the fuse portion of the corresponding second current collector is blown, the current paths of the other electrode assemblies remain electrically and structurally intact.

9. The non-aqueous electrolyte secondary battery of claim 1, wherein each of the plurality of second current collectors includes a current collector connection portion, a tilted portion, and a tab connection portion, the current collector connection portion is connected to the first current collector, the corresponding tab group is connected to the tab connection portion, the tilted portion connects the current collector connection portion and the tab connection portion, and is tilted with respect to both of the current collector connection portion and the tab connection portion.

* * * * *